(12) United States Patent
Feuillebois et al.

(10) Patent No.: US 8,190,304 B2
(45) Date of Patent: May 29, 2012

(54) AUTOMATIC CONFIGURATION-TRACKING APPARATUS, AND A METHOD AND A SYSTEM FOR SUCH TRACKING

(75) Inventors: Christian Feuillebois, Lambesc (FR); Mathieu Glade, Sanary sur Mer (FR); Eric Pauly, Vitrolles (FR)

(73) Assignee: Eurocopter, Marignane Cedex (FR)

( * ) Notice: Subject to any disclaimer, the term of this patent is extended or adjusted under 35 U.S.C. 154(b) by 621 days.

(21) Appl. No.: 12/404,976

(22) Filed: Mar. 16, 2009

(65) Prior Publication Data

US 2009/0234517 A1 Sep. 17, 2009

(30) Foreign Application Priority Data

Mar. 17, 2008 (FR) ...................................... 08 01433

(51) Int. Cl.
*G01C 23/00* (2006.01)
(52) U.S. Cl. .................. 701/3; 701/1; 701/301; 706/53; 709/219; 713/151; 713/168; 725/78; 235/492; 340/541; 342/32; 385/24
(58) Field of Classification Search .............. 701/1, 301; 706/53; 709/219; 713/151, 168; 725/78; 235/492; 340/541; 342/32; 385/24
See application file for complete search history.

(56) References Cited

U.S. PATENT DOCUMENTS

| | | | |
|---|---|---|---|
| 3,786,406 A | 1/1974 | Bianco | |
| 4,739,482 A | 4/1988 | Wrigge | |
| 5,058,044 A | 10/1991 | Stewart | |
| 5,250,761 A | 10/1993 | Koyanagi | |
| 6,859,757 B2 | 2/2005 | Muehl | |
| 7,047,159 B2 | 5/2006 | Muehl | |
| 2003/0233538 A1* | 12/2003 | Dutertre | 713/151 |
| 2004/0052450 A1* | 3/2004 | Morrison | 385/24 |
| 2004/0107027 A1* | 6/2004 | Boudrieau | 701/1 |
| 2005/0038876 A1* | 2/2005 | Chaudhuri | 709/219 |
| 2005/0248454 A1 | 11/2005 | Hanson | |
| 2006/0208891 A1 | 9/2006 | Ehrman | |
| 2007/0094089 A1 | 4/2007 | Wilbrink | |
| 2007/0114280 A1 | 5/2007 | Coop et al. | |
| 2007/0115125 A1 | 5/2007 | Lyon et al. | |

(Continued)

FOREIGN PATENT DOCUMENTS

EP 0495104 7/1992

(Continued)

OTHER PUBLICATIONS

Priority Search Report dated Nov. 19, 2008, in priority application.

*Primary Examiner* — James Trammell
*Assistant Examiner* — Sanjeev Malhotra
(74) *Attorney, Agent, or Firm* — Brooks Kushman P.C.

(57) ABSTRACT

An automatic configuration-tracking apparatus for tracking the configuration of a vehicle having a multitude of components for which it is desired to consult and record various items of data specific thereto, and their identification/authentication parameters, history, and operating state includes transponders. The transponders are coupled respectively to components of the vehicle. The transponders communicate this specific data via a meshed wireless network in order to enable the data to be transmitted by secure wireless transmission to an external installation. A secrecy perimeter coincides substantially with an outline of the vehicle.

7 Claims, 1 Drawing Sheet

U.S. PATENT DOCUMENTS

| | | |
|---|---|---|
| 2007/0174876 A1* | 7/2007 | Maggio et al. ............... 725/78 |
| 2007/0241908 A1 | 10/2007 | Coop |
| 2008/0083832 A1* | 4/2008 | Chang et al. ............... 235/492 |
| 2008/0158040 A1* | 7/2008 | Stayton et al. ............... 342/32 |
| 2009/0177614 A1* | 7/2009 | Angell et al. ............... 706/53 |
| 2010/0070180 A1* | 3/2010 | Ridenour ............... 701/301 |
| 2010/0090829 A1* | 4/2010 | Pujol ............... 340/541 |
| 2010/0199090 A1* | 8/2010 | Berbain et al. ............... 713/168 |

FOREIGN PATENT DOCUMENTS

| | | |
|---|---|---|
| FR | 2105206 | 4/1972 |
| FR | 2871260 | 12/2005 |
| GB | 2176637 | 12/1986 |
| GB | 2366430 | 3/2002 |
| WO | 9105319 A1 | 4/1991 |
| WO | 2004013785 A2 | 2/2004 |
| WO | 2007010619 | 1/2007 |
| WO | 2007106191 A2 | 9/2007 |
| WO | 2007132111 A1 | 11/2007 |
| WO | 2007133322 A2 | 11/2007 |

* cited by examiner

AUTOMATIC CONFIGURATION-TRACKING APPARATUS, AND A METHOD AND A SYSTEM FOR SUCH TRACKING

FIELD OF THE INVENTION

The invention relates to managing the configuration of a vehicle, and in particular of an aircraft such as a helicopter. In particular the invention lies in the field of maintenance and logistics in aviation.

BACKGROUND OF THE INVENTION

In such a vehicle, and more generally in any civilian or military equipment, most of the components are associated with a traceability system, both for on-board hardware such as component parts and pieces of equipment, and for intangibles such as software.

The system provides tracking and management of traceability data, typically including component identification, its guaranteed conditions, its manufacturers and users, and practical information such as its number of hours of operation, its fabrication date, and any changes made thereto.

At present, traceability data is physically coupled to the component, e.g. in the form of an optionally-riveted label, etched numbers, bar codes, etc. The component is said to be marked.

Component traceability data is also copied down or updated manually on a component log card (CLC or FME), i.e. on a document made of paper or card.

The data is also manually copied and updated in a tracking tool, which groups together and manages all of the CLCs of a given vehicle.

Although it provides numerous advantages, the present traceability system (markings, log card, and tracking tool) also suffers from imperfections.

Firstly, the traceability data can be falsified, so that components that are defective, incompatible, or counterfeit can be used in the vehicle to the detriment of its safety.

Moreover, e.g. while maintaining the vehicle, it can be difficult or tedious to consult the data, in particular when the component carrying the data is difficult to access.

Furthermore, with present traceability systems, updates are performed only occasionally, usually after the component has been removed or when the vehicle is subjected to maintenance. Also, updating is usually performed by writing or manual input, which runs the risk of being a source of error.

Recent progress over the last few tens of years in the field of electronics and wireless communications have made it easier to acquire, store, and manage traceability data.

In this respect, certain documents relating to more or less fully automated traceability systems are mentioned below.

Document EP 0 495 104 describes a vehicle management system in which a contactless card records various items of information relating to the use of the vehicle. An electronic identification label is attached to the vehicle cabin.

Document FR 2 105 206 describes a wireless link between a structure that is to be monitored for potential deficiencies, and a system for automatically triggering an action in the event of the structure suffering a deficiency.

Document FR 2 871 260 describes a maintenance memory that is contained in a piece of equipment or that is added thereto. The memory contains non-modifiable zones for storing basic information from the manufacturer, and modifiable zones for storing information associated with events.

Document GB 2 366 430 describes coupling a radiofrequency identification (RFID) electronic label to a vehicle part for the purpose of identifying the part and of the deducing a technical procedure (here recycling) for application to said part after it has been removed from the vehicle, as opposed to when it is incorporated in the vehicle.

Document GB 2 176 637 describes complex equipment with an incorporated electronic memory, within which information such as an identifier of the equipment and maintenance instructions are recorded or read. The information is made readable by means of a computer, e.g. in a repair center. The way in which the computer and the equipment are connected together is nevertheless not specified in that document.

Document U.S. Pat. No. 4,739,482 describes an automatic display for certain maintenance intervals of a vehicle.

Document U.S. Pat. No. 5,058,044 describes a concentration of state information concerning a vehicle and coming from various components of the vehicle, for the purpose of performing a secure transaction at high frequency between the vehicle and a maintenance station for the vehicle. The reading of the labels is conditioned by the validity of an identifier recorded in the memory of each label.

Document U.S. Pat. No. 6,859,757 describes a method and a system for maintaining a complex article, i.e. a "tangible structure assembled from individually labeled components". While maintenance is being performed, component maintenance information is recorded for at least two electronically accessible labels, each coupled to a respective component of the complex article. For at least one of a plurality of electronic labels, at least a portion of the maintenance information describing the maintenance of the complex article as a whole is recorded. To perform this maintenance, the maintenance information concerning the component is recorded. At least one of the labels includes maintenance information concerning the complex article as a whole.

Document U.S. Pat. No. 7,047,159 describes a method of maintaining a complex article. First maintenance information relating to a first component of the article is retrieved from an electronic label that is coupled to said component. Second maintenance information is retrieved relating to a second component of the article from an electronic label coupled to the component. Thereafter, on the basis of said first or second information, one or more information is determined concerning the maintenance procedure to be performed on the first component. Maintenance software suitable for causing a computer to receive maintenance information determines a maintenance diary for the complex article on the basis of the maintenance information from the labels.

Document US 2007/0241908 describes managing data concerning the maintenance of an aircraft, with electronic labels being associated with components of the aircraft. A section of the aircraft is displayed, showing the locations within said section of components that have labels associated therewith. A reader is suitable for reading data transmitted by each of the labels and a memory-forming database stores the maintenance data, including data read by the reader. A user interface enables the maintenance data to be retrieved from the database, and enables the retrieved data to be displayed.

Document US 2007/0094089 provides for integrating in a car electronic labels that are coupled to parts that are suitable for being subjected to maintenance, an on-board reader, and on-board database that collates the information coming from the labels in particular.

Document WO 2007/0010619 describes a system for managing the loading freight onto a vehicle, e.g. a helicopter. In order to make loading easier, wireless transmitters (e.g. RFIDs) are placed on the articles to be loaded, and a plurality of compatible wireless detectors are placed around a loading bay. As a result, position values, possibly dynamic values, concerning the positions of loads relative to the bay are calculated by the system via triangulation operations.

In practice, the application of electronic labels to traceability techniques in the field of managing the configuration of a vehicle such as a helicopter raises specific difficulties to which the above-mentioned documents do not provide a satisfactory solution.

Thus, present traceability techniques making use of electronic labels can give rise to problems of safety, for example because certain electronic labels have a range of several meters or even about ten meters. Consequently, radiofrequency signals are emitted by those labels that can be picked up without the knowledge of authorized persons, and those signals subsequently run the risk of being decrypted.

With known systems, except by having a local installation of considerable size such as a loading frame fitted with appropriate readers, communication with the outside, e.g. for consulting the configuration of the vehicle, is inconvenient in the sense that it is difficult to excite the labels.

An alternative to such large installations, e.g. in the context of consulting data on an isolated theater of action such as an emergency intervention in the countryside, would be to provide a system of on-board labels having long range (typically active labels), but that goes against security constraints and weight constraints to which vehicles are subjected.

For use on an airborne vehicle, the weight of electronic traceability systems, including labels coupled to components, can be very penalizing or even completely prohibitive.

Furthermore, the specific environment in which such labels need to communicate is very constraining, since the vehicle possesses structures that constitute intrinsic generators of radio interference, in particular metal components, fluid tanks, connection systems, and on-board electronics.

Given their range in such an environment, the communication reliability of ordinary labels is found to be unsatisfactory.

On similar lines, electronic labels coupled to vehicle components need to operate under ambient conditions that can be extremely aggressive. Consequently, the lifetime of coupled labels runs the risk of not matching the lifetime of the components to which they are coupled, which may for example be as great as 20 years or 6000 operating hours.

Furthermore, standards and regulations in the context of aviation are particularly severe, and any traceability systems used must comply scrupulously with their provisions.

From the above, it can be understood firstly that increasing the range of on-board labels is undesirable from a security point of view and also from the point of view of the payload of the vehicle.

Secondly, the use of labels that are lightweight and simple raises not only problems of reading them (reliability, range, etc.), but also greatly reduces any possibility for encryption and authentication, since such simple labels are limited in terms of the processing they can perform, or even they do not have any processor suitable for executing the complex functions that are needed for security purposes.

The requirements that need to be satisfied for configuration management thus make it necessary to go beyond present-day solutions that are contradictory to such requirements.

From a design point of view, in terms of information systems logic, in present proposals for traceability using electronic labels, it is paradoxical that maintenance is based on the vehicle, whereas it is the components such as spare parts that constitute the core of such maintenance.

It would therefore be preferable to make it possible, at any time, to interrogate in real time components that are coupled to a label of a traceability system.

Beyond the functions that are found to be problematic with the above-mentioned traceability systems, it would be advantageous for it to be possible for aviation logistics and maintenance to be combined with services such as tracking individual components of vehicles regardless of their theater of operation, optimizing flight and maintenance planning, and optimizing component availability (stocks and orders with manufacturers), while ensuring that they are guaranteed original components in order to combat counterfeiting.

OBJECT AND SUMMARY OF THE INVENTION

For this purpose, an object of the invention is to provide a method of tracking the configuration of a vehicle, in particular an aircraft such as a helicopter, the vehicle comprising a multitude of components about which it is desired to consult and record various items of data specific thereto and in particular their identification/authentication parameters, history, and operating state.

The method provides a prior stage of installing a plurality of on-board wireless electronic labels on the components of the vehicle, each label being coupled and dedicated to a particular component.

Thereafter, there is a transaction stage, including a step of transferring data between the vehicle and an external installation.

According to the invention, the installation stage provides for a fitting step of fitting on board the vehicle at least two local readers, together with at least one compatible wireless router that is connected to one or more local readers, each local reader being compatible with and near to a group of on-board electronic labels.

At least one wireless concentrator that is compatible with at least one wireless router is installed and configured during the fitting step for the purpose of communicating firstly at least with said router and secondly with the external installation.

Thus, during the transfer step, the external installation communicates exclusively with the wireless concentrator, this communication passing within the vehicle between at least one base node wirelessly connecting a group of labels to their local reader via an intermediate network frame that wirelessly connects the local reader to at least one router, and an on-board terminal mesh connecting the router to the concentrator, said on-board node, network frame, and mesh forming a wireless mesh network.

The electronic labels are suitable for communicating wirelessly with a nearby reader exclusively within their own respective nodes, with a nearby reader, while the on-board router is suitable for communicating wirelessly exclusively within its mesh with the compatible concentrator, in particular during the transaction stage.

According to a characteristic, during the installation stage, the wireless mesh network is configured, in particular in terms of range and of wireless communications protocol, to define around the vehicle said secrecy perimeter that coincides substantially with the outline (i.e. contour) of the vehicle or is at least close to said outline, outside which perimeter no wireless reading or writing of the electronic labels is possible.

According to another characteristic, during the installation stage, each wireless node is configured so that its electronic labels are coupled to components forming a functional sector or group of the vehicle.

According to yet another characteristic, the transaction stage, and in particular its transfer step, is performed in a manner that is secure, automatic, and regular, in particular on each occasion the vehicle is used or maintained. In particular, the transaction stage is performed at regular intervals that are determined as a function of the way an on-board timer is programmed, or at the end of a period of use or maintenance of the vehicle. For example, a detector for detecting a state of the vehicle (e.g. landing of an aircraft) is logically coupled to the mesh of the concentrator in such a manner that a given state triggers the transaction stage.

In addition, or alternatively, the transaction stage may also be triggered manually or on demand, in particular from the external installation or from a dedicated on-board control.

During the transaction stage, specific data is transmitted from the electronic labels or is updated from the concentrator in particular, with at least one step of coordination between a plurality of nodes and/or at least one step of filtering the specific data.

According to a characteristic, the wireless communication within a node, a network frame, and a mesh, makes use of the ultra-high frequency (UHF) range, in particular being of the wireless personal area network (WPAN) type and in particular using a low rate WPAN (LR WPAN).

These communications are thus secure radio links, e.g. complying with the Zigbee protocol (see Internet site: http://www.zigbee.org) based on the IEEE 802.15.4 standard (see Internet site: http://www.standards.ieee.org/getieee802/index.html).

The invention also provides an automatic system for tracking the configuration of a vehicle, and suitable for implementing the above-mentioned method.

The system comprises an installation external to the vehicle having a tracking tool, and at least on board the vehicle a plurality of wireless electronic labels, each label being coupled to a component of the vehicle, at least two local readers for forming a base node with a group of electronic labels, at least one nearby router for forming an intermediate network frame with a local reader, and at least one on-board concentrator for forming a terminal mesh of a secure wireless mesh network, via which network of specific data to the components is transmitted between the labels and the external installation.

The invention also provides a vehicle, and in particular to an aircraft such as a helicopter, that includes at least one tracking system as mentioned above.

According to the invention, a secrecy perimeter coincides substantially with an outline of the vehicle or is at least close to said outline, with no wireless reading or writing of the electronic labels of the vehicle being possible outside said perimeter.

In one embodiment, the vehicle is subdivided into functional sectors within each of which sectors there is arranged a group of electronic labels, at least one vital functional sector including one or more active labels, while other sectors of the vehicle include passive or semi-active labels exclusively, i.e. where semi-active labels have their own power supply that provides power only to a chip of the label without providing power for wireless communication.

In one embodiment, the tracking system is connected to a low consumption power supply, in particular the power supply comprises at least one battery and a piezoelectric device for charging the battery.

In one embodiment, the tracking system presents at least one communications frequency range that is distinct from all of the other frequency ranges used by the electronics of the vehicle.

BRIEF DESCRIPTION OF THE DRAWING

Other features and advantages of the invention appear from the following detailed description made with reference to the accompanying drawing.

In the drawings.

MORE DETAILED DESCRIPTION

Figure 1:
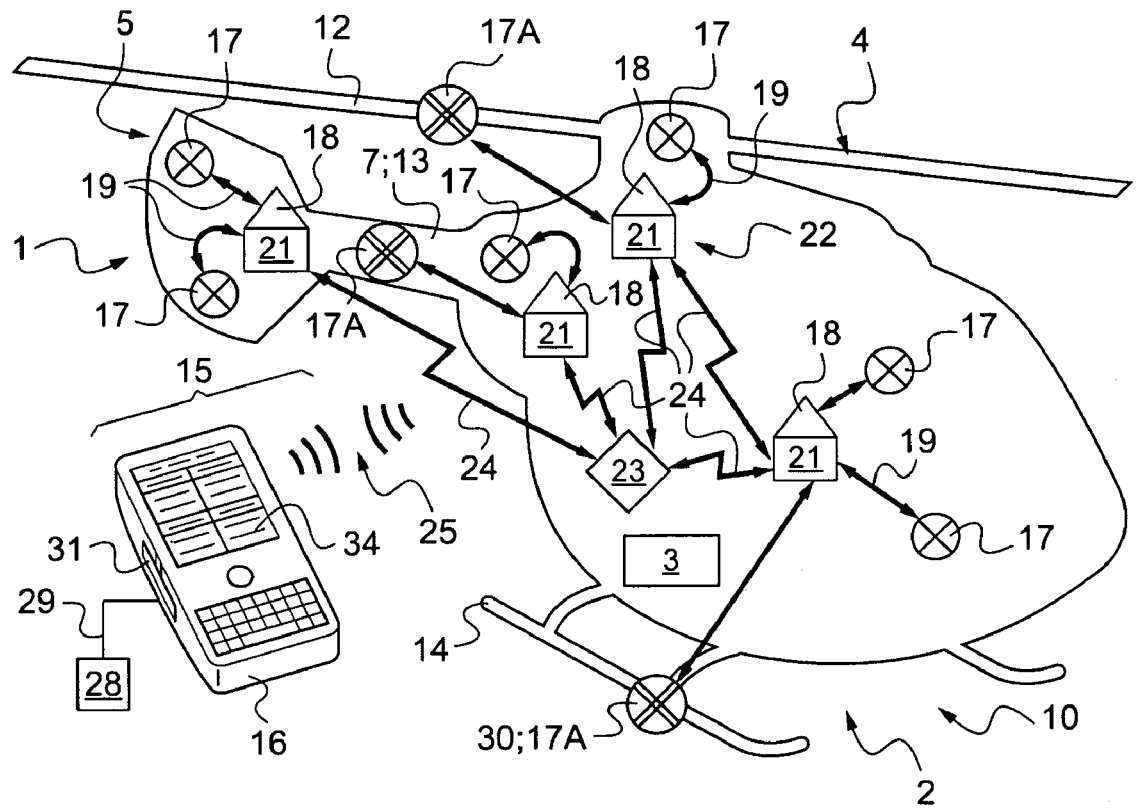
FIG. 1 is a diagrammatic perspective view of a vehicle fitted with an automatic configuration-tracking system of the invention, and a portable external installation having a tracking tool.

In FIG. 1, numerical reference 1 is a general reference to a vehicle 1, here a helicopter. Naturally, this type of vehicle 1 is merely an example, and the invention also covers other types of vehicle that are subjected to the same constraints in terms of configuration tracking, such as aircraft and other military or civilian vehicles.

The vehicle 1 possesses a considerable number of components, such as the on-board portion of a configuration tracking system 2 having structures and operating methods that are described below.

Numerical reference 3 is a general reference designating an electronic setup on board the vehicle 1. The electronic setup 3 comprises functional groups serving in particular to provide electrical power, radio communication, and radio navigation for the vehicle 1.

Figure 3:
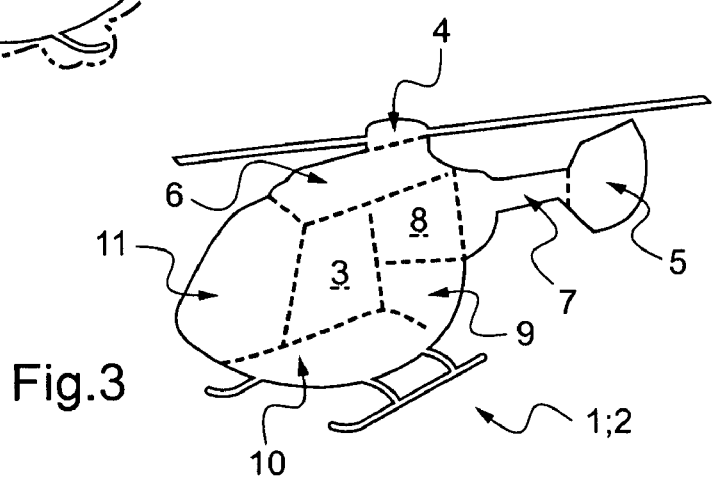
FIG. 3 is another perspective view of a vehicle in accordance with the invention, in which functional sectors are represented diagrammatically.

Furthermore (see FIG. 3), the vehicle 1 has functional sectors that frequently correspond to functional groups, such as for example: the main rotor functional group 4 (more simply group 4); the anti-torque rotor functional group 5 (group 5); the main gearbox (MGB) functional group 6 (group 6); the tail boom functional group 7 (group 7); the turbines functional group 8 (group 8); the tanks and fluids functional group 9 (group 9); the structure and landing gear functional group 10 (group 10); and the cockpit functional group 11 (group 11).

Within the main rotor functional group 4, a rotor blade 12 is considered as being a vital component of the vehicle 1. Similarly, within the tail boom functional group 7, a load-carrying structure 13 is considered as being a vital component of the vehicle 1. A landing skid 14 of the structure and landing gear functional group 10 is likewise considered as a vital component of the vehicle 1.

That said, the configuration-tracking system 2 of the vehicle 1 in accordance with the invention is described below with reference to FIG. 1.

The system 2 includes an installation 15 external to the vehicle 1 having one or more tracking tools, such as the tool given numerical reference 16.

The tracking tool 16 is a handheld computer. By way of example, one embodiment makes provision for the tool 16 to be a handheld computer of the HP iPAQ nx2490 type, for which technical data is to be found for example on the Internet site: http://www.hp.com/eur/handhelds On board the vehicle 1, the system 2 includes a plurality of wireless electronic labels given overall reference 17. Each of these labels 17 is coupled to a component of the vehicle 1 for which it is desired to provide tracking.

In FIG. 1, the labels (or transponders) of active type are referenced 17A.

Various types of transponder 17 are used with the invention, and in particular:

active transponders 17A each containing an internal battery enabling the chip to be powered and enabling a signal to be broadcast to a reader 18. The availability of the signal from such a transponder 17A is continuous, e.g. to a range of 30 meters (m). The strength of the signal from the transponder 17A is high, and in contrast the signal strength required by the reader 18 is very low;

passive transponders 17 do not have batteries, and they take their power from radio waves, so operation of the chip therefore depends on the reader 18 operating. The availability of the transponder 17 is limited to the transmission field of the reader 18 which gives a range of less than 3 m, for example. The strength of the signal from the transponder 17 is weak. Unlike an active transponder 17A, the signal strength required by the reader 18 for a passive label 17 is very high; and semi-active transponders, also referenced 17, each containing a battery for powering its chip. The power for transmitting radio waves comes from the reader 18. The availability of the signal from the transponder is limited to the field of the reader 18. The strength of the signal for the transponder and the signal strength required by the reader 18 are low.

The type of label (passive, semi-active, or active) that needs to be selected for tracking a given part of the vehicle 1 can be determined as a function in particular of parameters such as:

the accessibility of the part, given that labels requiring few interventions and having long lifetime are, for example, selected for parts that are difficult of access;

the environment of the part, given that labels having the highest transmission and reception capabilities are selected, for example, for parts in an environment that interferes with such capabilities;

the proximity of a potential location for the reader dedicated to communicating with a label, given that labels having the longest ranges are selected, for example, for parts associated with a dedicated reader that is remote therefrom;

etc.

In FIG. 1, the active labels 17A are coupled to vital components of the vehicle 1, here the blades 12 of the main rotor of group 4, the structure 13 of group 7, and the skids 14 of group 10.

For the transponders 17 and 17A that require a power supply distinct from the radio wave source with which they communicate, and also for other parts of the system 2 having power supply requirements integrated in their own structure, for example, these parts and/or transponders are fitted with or connected to power supply devices 30.

In FIG. 1, one such device 30 is incorporated in the transponder 17A of the skid 14 of group 10, and comprises a piezoelectric electricity-producing device, that powers a storage battery or the like of the transponder 17A.

As mentioned above, the system 2 includes within the vehicle 1 at least one local reader 18, i.e. a reader that is on board and dedicated to recording and/or reading one or more transponders, be they active, semi-active, or passive.

Typically, each on-board reader 18 is located close to or in the functional sector or functional group to which it is dedicated. By way of example, in FIG. 1 the reader 18 situated furthest to the left is located within the anti-torque rotor functional group 5 and carries out interchanges or communicates locally with the transponders 17 in this group.

Thus, a set of electronic labels 17 (e.g. the set of group 5 in FIG. 1) forms one of the nodes 19 on which mesh network in accordance with the invention is based.

Still within the vehicle 1, the system 2 includes at least one nearby router 21, i.e. a router that is on board and dedicated to transmission internal to the vehicle 1 of recordings and/or readings from one or more transponders 17 (active, semi-active, or passive).

Like the readers 18, each on-board router 21 is located close to or within a functional sector of functional group to which it is dedicated, so as to form an intermediate wireless network frame with a local reader 18 (only one network frame is shown in FIG. 1, close to the blade 12 of group 4).

The system 2 also has at least one concentrator 23. Such a concentrator 23 recognizes the various wireless objects (transponders 17, readers 18, etc.) connected to its local wireless network.

On receiving information, e.g. from a nearby reader 18, the dedicated concentrator 23 decodes the header of this information in order to discover its destination and sends it only to the intended wireless objects. This reduces traffic over the network as a whole.

A concentrator 23 works at levels corresponding to the network layer of the open system interconnection (OSI) model of the International Standards Organization (ISO). By analogy, it could be said that the transponders 17 operate at the physical layer, and that the readers 18 operate at the data link layer of the OSI model.

The on-board concentrator 23 together with the routers 21 form a terminal mesh 24 of a secure wireless mesh network, via which network data specific to the components is transmitted between the labels 17 and the installation 15 (portion external to the vehicle 1 of the system 2).

This external transmission, referenced 25 in FIG. 1, is described below.

Figure 2:
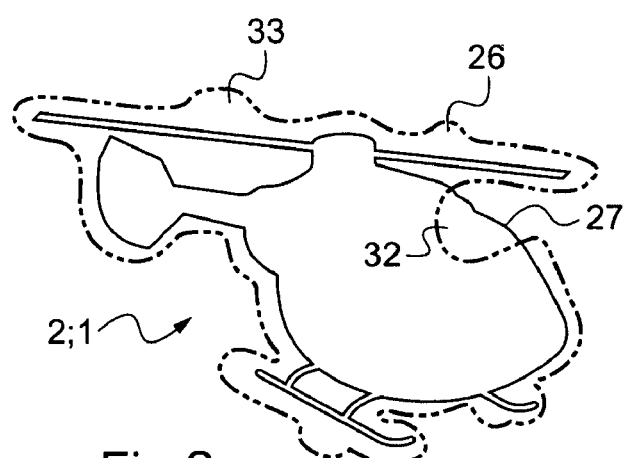
FIG. 2 is a diagrammatic view of a vehicle in accordance with the invention having a secrecy perimeter that fits closely substantially around the outline of the vehicle.

In FIG. 2, there can be seen a secrecy perimeter 26 of the invention that is represented by a chain-dotted line.

The perimeter 26 coincides substantially with the outline 27 (continuous lines) of the vehicle 1, or at least it is close to said outline 27.

Outside the perimeter 26 no unauthorized wireless reading or writing is possible, naturally with the exception of authorized transactions 25. Specifically, the system 2 is configured to prevent direct transactions from the outside with the electronic labels 17. The transactions 25 with the external installation 15 thus pass through the concentrator 23.

Furthermore, the on-board mesh network, and in particular its meshes 24, serves to provide a security shunt through which data from the transponders 17 can be conveyed and verified (data integrity check).

The fact that the perimeter 26 and the physical outline 27 of the vehicle 1 are extremely close together is made possible by the above-described "on-board" wireless mesh network (node 19, network frame 22, and terminal mesh 24). This limits risks of spying and enables configuration tracking to be performed without a complex installation, e.g. in a theater of operation with the vehicle 1 remote from major infrastructure.

Nevertheless, the data collected from the concentrator 23 via the transmission 25 and by the tool 16 can, after it has been collected, easily be delivered and used outside the system 2. For example, numerical reference 28 in FIG. 1 represents a ground station which can receive and process data coming from the system 2 via a wired or wireless link 29.

Typically, such a station 28 connects the installation 15 and various interfaces to the businesses involved in manufacturing or maintaining the vehicle 1, authorities in charge of the fleet of which the vehicle 1 forms a part, organizations in charge of technical documentation relating to the vehicle 1, etc.

Another security aspect of the invention is that the tracking system 2 is configured so that communications take place in frequency ranges that are different from all of those used by the setup 3 of the vehicle 1.

Thus, the wireless communications within the nodes 19, the network frames 22, and the meshes 24 make use of the ultra-high frequency (UHF) range, in particular via a network having the dimensions of a wireless personal area network (WPAN), and possibly a low rate WPAM (LR WPAN).

Such communications are thus secure radio links, e.g. in compliance of the Zigbee protocol (see Internet site: http://www.zigbee.org) based on the IEEE 802.15.4 standard (see the Internet site: http://standards.ieee.org/getieee802/index.html).

In FIG. 1, transmissions 25 between the installation 15 and the vehicle 1 are also in compliance with this protocol.

However embodiments could be provided for example in which communications between the passive transponders 17 and their readers 18 communicate at a frequency of about 869 megahertz (MHz), while the active transponders 17A communicate at a frequency of about 2.4 gigahertz (GHz).

Depending on circumstances, the passive transponders 17 have dedicated readers 18 that are distinct from the readers 18 in charge of communications with the active transponders 17A. Alternatively, common readers act as readers and recorders of the transponders 17 whether passive or active.

With the main hardware aspects of the invention described above, there follows a description of the method of configuration tracking.

The method seeks to make it possible to consult and record, wherever possible automatically, various data items specific to the components of the vehicle 1, and in particular their identification/authentication parameters, their history, and their operating state.

The method provides for a prior stage of installing a plurality of on-board wireless electronic labels 17 on the components of the vehicle 1, each label being coupled with and dedicated to a particular component.

Then a transaction stage is provided with a step of transferring data between the vehicle 1 and the external installation 15.

Furthermore, the installation stage provides a fitting step of fitting local readers 18 on board the vehicle 1, together with compatible wireless routers 21 that are connected to one or more local readers 18.

As mentioned above, each local reader 18 is compatible with and close to a group (4-11) of on-board electronic labels.

Since the wireless concentrator 23 is compatible with the routers 21, it is installed and configured during the fitting step so as to communicate firstly with the routers 21 and secondly with the external installation 15.

As mentioned above, the transmission 25 is wireless transmission. An embodiment that is not shown provides for the concentrator 23 to include a bay for receiving transfer cards or the like (USB keys, memory cards, optical disks, etc.). In FIG. 1, the tool 16 also possesses a bay 31 for receiving such a transfer card.

Thus, except when data is entered via a physical medium, the installation 15 communicates during the wireless transfer step exclusively with the concentrator 23.

This wireless communication passes through the vehicle 1 between at least the nodes 19 via the intermediate network frame 22 and a terminal mesh 24 that connects the routers 21 to the concentrator 23, i.e. via the wireless mesh network.

For questions of security in particular, the labels 17 on board the vehicle 1 are suitable for communicating solely within their own nodes 19, with one or more local or nearby readers 21.

The routers 21 are suitable for communicating exclusively within the meshes 24 with the concentrator 23, in particular during the transaction stage.

Upstream, during the installation stage, the wireless mesh network is naturally configured, in particular in terms of range and of wireless communications protocol, so as to define the secrecy perimeter 26 around the vehicle 1 so that it coincides substantially with the outline 27.

In FIG. 2, this perimeter 26 has zones 32 and 33. The zone 32 extends into the inside of the outline 27 (here into the cabin of the aircraft 1), while lying outside the perimeter 26. In other words, this zone 32 is voluntarily kept outside the perimeter 26 so that passengers in the vehicle 1 cannot access data of the system 2.

The zone 33 constitutes a range projection from certain transponders 17, e.g. active transponders.

During the installation stage, each wireless node 19 is configured so that the labels 17 are coupled to components forming a functional sector or group of the vehicle 1.

The transaction stage of the method, and in particular its transfer step, is performed in secure manner.

To illustrate this point, a component log card CLC that is associated with a computer of the setup 3 of the vehicle 1 is used by way of example.

At some given instant, such a card is as follows (Table 1):

TABLE 1

Component log card

| (Component identification) | | Guarantee | |
| --- | --- | --- | --- |
| Card No. | 2 | Component Delivery date | |
| Name | Computer | | |
| NATO nomenclature | | Guarantee duration of storage | |
| Constructor reference | 03B2012FR | Start of service date | |
| Manufacture reference | URL210 | Guaranteed operating duration | |
| Delivery configuration | | | |
| Serial No. | 5012 | | |
| Manufacturer | FA18 | | |
| NATO code | | | |
| Version | | | |
| Amendments | | | |
| Type | | Particular information | |
| Tender or order | | Date of latest revision | Aug. 1, 2005 |
| Reference | | Type of inspection | 750 h |
| Issuing organization | | Flying hours | 1200 h |
| Supplier | | Operating hours on removal | 1350 h |
| Date | | Operating hours on installation | 1355 h |
| Batch No. | | Removal date | Aug. 1, 2005 |
| Address | | Installation date | Sep. 1, 2005 |

If the data needs to be updated, e.g. at the request of a maintenance operator, the operator, e.g. with the help of the tool 16, interrogates the concentrator 23. This is referred to as manual interrogation.

The concentrator 23 has its own memory and recorded therein are the replies to the various requests sent to the transponders 17 and supplied via the on-board wireless mesh network.

Thus, a database specific to the vehicle 1 is read from the memory of the concentrator 23, and has the following appearance (Table 2):

TABLE 2

Vehicle database
Hardware and software configuration of on-board equipment
Subject to prescribed maintenance intervals

| (Identification of the component) | | Particular information | |
|---|---|---|---|
| Equipment No. | N | New equipment | NO |
| Name | AP computer | Latest revision date | Aug. 1, 2005 |
| NATO nomenclature | | Type of inspection | 750 h |
| Constructor reference | 03B2012FR | Flying hours | 1200 h |
| Manufacturer reference | URL210 | Operating hours on removal | 1350 h |
| Software version | V 5.2 | Operating hours on installation | 1355 h |
| Application version | V 4.2 | Date of removal | Aug. 1, 2005 |
| Serial No. | 512 | Date of installation | Sep. 1, 2005 |
| Manufacturer | FA18 | | |

Taking as an example the number of flying hours of a vehicle 1, if the most recent flight lasted for 2 hours, then the corresponding fields in the CLC cards and in the database of the vehicle 1 appear as follows (Tables 3 and 4).

It is emphasized at this point that in this context all of the CLC cards of the vehicle 1 corresponding to components having transponders 17 coupled thereto are updated in this manner (flying hours=1200+2=1202 hours).

For example, such updating is the result of action by a maintenance operator, or else it is triggered automatically, e.g. when the vehicle 1 lands.

With reference to FIG. 1, since the tracking tool 16 includes a display 34 such as a liquid crystal screen, the CLC cards can be displayed on the screen 34 substantially in the same manner as they appear in Tables 1 and 3, for example. Here, the concentrator 23 thus also performs a role of coordinating the parts of the system 2, and of the data coming therefrom.

TABLE 3

Computer log card

| (Component identification) | | Guarantee | |
|---|---|---|---|
| Card No. | 2 | Component Delivery date | |
| Name | Computer | | |
| NATO nomenclature | | Guarantee duration of storage | |
| Constructor reference | 03B2012FR | Start of service date | |
| Manufacture reference | URL210 | Guaranteed operating duration | |
| Delivery configuration | | | |
| Serial No. | 5012 | | |
| Manufacturer | FA18 | | |
| NATO code | | | |
| Version | | | |
| Amendments | | | |
| Type | | Particular information | |
| Tender or order | | Date of latest revision | Aug. 1, 2005 |

TABLE 3-continued

Computer log card

| (Component identification) | | Guarantee | |
|---|---|---|---|
| Reference | | Type of inspection | 750 h |
| Issuing organization | | Flying hours | 1202 h |
| Supplier | | Operating hours on removal | 1350 h |
| Date | | Operating hours on installation | 1355 h |
| Batch No. | | Removal date | Aug. 1, 2005 |
| Address | | Installation date | Sep. 1, 2005 |

TABLE 4

Vehicle database
Hardware and software configuration of on-board equipment
Subject to prescribed maintenance intervals

| (Identification of the component) | | Particular information | |
|---|---|---|---|
| Equipment No. | N | New equipment | NO |
| Name | AP computer | Latest revision date | Aug. 1, 2005 |
| NATO nomenclature | | Type of inspection | 750 h |
| Constructor reference | 03B2012FR | Flying hours | 1202 h |
| Manufacturer reference | URL210 | Operating hours on removal | 1350 h |
| Software version | V 5.2 | Operating hours on installation | 1355 h |
| Application version | V 4.2 | Date of removal | Aug. 1, 2005 |
| Serial No. | 512 | Date of installation | Sep. 1, 2005 |
| Manufacturer | FA18 | | |

From the above, it can be understood why the method of the invention is said to be automatic. At a convenient location in the vehicle 1, a switch is provided in certain versions to switch between manual and automatic modes of operation of the system 2.

Data may be collected from the system 2 on a regular basis, in particular whenever the vehicle 1 is used or maintained. Specifically, the transaction step may be performed at regular intervals, determined as a function of how an on-board timer is programmed, or at the end of the vehicle 1 being used or maintained.

For example, a detector of the state of the vehicle 1, which detector is incorporated in the vehicle 1 (e.g. within a transponder 17A that incorporates a suitable sensor), transmits signals that are synonymous with landing.

If the transponder 17A in question is logically coupled to the mesh of the concentrator 23, a given state (landing) triggers the transaction stage of the method of the invention.

To summarize, the transaction stage may be triggered automatically, manually, or on demand, in particular from the installation 15 or from a dedicated on-board control.

During the transaction stage, the specific data is transmitted from the labels 17 or updated from the concentrator 23, in particular, with at least one step of coordination between a plurality of nodes and/or at least one step of filtering of the specific data. Comparing Tables 1 and 2 where the data of one is derived from the other, shows clearly the type of filtering that is performed.

If equipment or a component of the vehicle 1 is replaced, the Tables 1 and 2 are modified to give new values (Table 5):

TABLE 5

Vehicle database
Hardware and software configuration of on-board equipment
Subject to prescribed maintenance intervals

| (Identification of the component) | | Particular information | |
|---|---|---|---|
| Equipment No. | N | New equipment | YES |
| Name | AP computer | Latest revision date | |
| NATO nomenclature | | Type of inspection | |
| Constructor reference | 03B2012FR | Flying hours | |
| Manufacturer reference | URL210 | Operating hours on removal | 0 h |
| Software version | V 5.2 | Operating hours on installation | 0 h |
| Application version | V 4.2 | Date of removal | |
| Serial No. | 0001 | Date of installation | |
| Manufacturer | FA18 | | |

As mentioned above, the invention seeks to integrate RFID technology with a wireless mesh network in a helicopter to manage vehicle configuration.

The innovation thus applies to the field of maintenance and of spare part logistics in aviation. By using RFID technology, one object is to be able to track parts individually on board an aircraft, so as to enable the aviation industry to propose novel support solutions as a service to aviation operators.

Recent progress made in the miniaturization of electronic systems, and also in the acquisition and storage of data, open up unprecedented and advantageous perspectives in the field of tracking data concerning on-board mechanical and electronic parts.

Expected advantages are as follows:
  setting up novel services by means of the invention:
    tracking the potential of respective individual parts of a machine in real time, including when at remote theaters of operation;
    optimizing maintenance task planning at all levels, and consequently optimizing flight planning;
    optimizing stock planning as a function of the potential of each part tracked in "real time";
    optimizing the ordering and manufacture of spare parts (in particular for flying-hour operators of helicopters);
    optimizing operational availability; and
    guaranteeing that parts are original by taking measures to combat counterfeiting;
  defining specific technologies by:
    fabricating transponders, readers, and a concentrator having increased performance to satisfy the needs of the invention;
    transponder packaging that is robust so as to satisfy the severe environmental conditions involved in aviation;
    means dedicated to making data secure, to certification, and to authenticating products; and
    reading/writing transponders at a range of 5 m to 10 m in difficult environments (metals, fluids, . . . ).

The above is not possible with prior traceability systems. In particular, the invention makes numerous additional functions possible, unlike individual tracking using component log cards (CLCs) that are genuinely pieces of card. With such cards, tracking is manual and performed by maintenance operators, by technical bureaus, and by equipment manufacturers.

Traceability elements for aviation parts are presently based mostly on bar codes, on etched numbers, and on optionally-riveted labels, giving the serial number, the manufacturer's reference, and other data, which can be falsified and which can also be difficult to read (these means need to be read at very short range), therefore often requiring equipment to be dismantled when zones are not accessible.

A CLC is not operated dynamically by intelligent on-board systems: in the past, it is the pilot who has had to validate flying hours or numbers of cycles performed, with this being done by means of an official document. The data is then copied either into a database external to the aircraft, for managing all of the CLCs of said aircraft, or else directly onto a CLC after broken-down equipment has been removed or subjected to revision.

In contrast, the invention gives access to the following functions. By using an electronic label of the RFID type, it is possible to obtain a kind of electronic CLC.

With an electronic CLC, each part (whether mechanical or electronic) that is the subject of potential tracking and maintenance tasks (PRE) is marked with the help of an electronic label of the invention, which is stuck on and readable remotely by means of a reader (target: up to 10 meters of distance for reading/writing).

The chip contains information concerning the maintenance and the use of the part from fabrication to final use (corresponding to its lifetime in hours, in calendar units, or in cycles); and this applies regardless of the vehicle (helicopter) on which it is mounted.

As a reminder, here are the usual operating frequency ranges of the transponders:
  frequencies of 125 kilohertz (kHz) to 132.2 kHz (passive transponders);
  the frequency of 13.56 MHz (passive transponders);
  the 860 MHz to 960 MHz frequency band (ultra-high frequency, UHF) (passive transponders, active transponders); and
  the 2.4 GHz to 2.56 GHz frequency band (passive, semi-active, and active transponders).

Furthermore, the tracking information contained in the RFID chip makes it possible with the invention to keep up to date in dynamic manner, at the end of each flight, by means of a wireless network including readers of passive and semi-active transponders.

Thus, each chip contains its accumulated duration of use, the maintenance operations to which it has been subjected, its configuration (serial number, manufacturer's part reference, version of on-board software, etc.).

For additional details, the invention makes use of several ideas that are advantageously combined:
  the use of RFID technology for tracking part traceability;
  integrating identification and maintenance data of a mechanical or an electronic part in an RFID transponder, and in particular data that has previously been contained in CLCs);
  integrating constructor authentication data in the RFID transponder for the purpose of combating spare-part counterfeiting;
  the use of one or more wireless communications protocols that are secure, so as to enable data to be transferred up and down (from transponders to readers, and vice versa);
  the possibility of centralizing some of the transponder maintenance data (and thus some of the part maintenance data) in an on-board concentrator via the readers/routers; and
  transferring data from the concentrator to a ground tracking tool, or indeed to any other on-board equipment, via a digital or serial link.

For updating data and databases, the invention can provide a variety of formulae. Thus, adapting the application to the requirements of aviation requires the following technological advantage:

compatibility of electronic labels with equipment on board the vehicle 1 and with its environment (so-called "packaging" requirements, ability to bond on the tracked component, ability to withstand pollution, etc.);

keeping the maintenance data incorporated in the labels secure against counterfeiting and piracy;

making up or down maintenance data updating reliable;

adapting RFID technology and UHF technology to cope with environmental requirements (temperature, vibration, impacts, crash resistance, etc.) and to the electromagnetic requirements of aviation;

developing a specific on-board concentrator, e.g. incorporating the functions of network coordinator and maintenance data centralizer;

developing readers for passive and semi-active transponders, e.g. readers that also act as routers;

developing a secure communications protocol between the concentrator, the readers, and the transponders (e.g. incorporating authentication and/or encryption);

adapting the electrical power supply of the concentrator and/or the readers to the power supply networks on board aircraft and to battery lifetime constraints determined by maintenance requirements;

developing RFID modules and UHF readers that present low consumption, by designing specific structures for recharging batteries (e.g. piezoelectric devices);

adapting the UHF operating frequencies of the mesh network, in particular of the readers, given the frequency ranges that are not already used in aviation (no pollution or inference acceptable with on-board radiocommunications or radio navigation); nevertheless, because of the constraints of such systems on board aircraft, and in order to avoid any electromagnetic disturbance that might be harmful to the operation of an aircraft as a whole, the method of the invention might optionally be implemented on the ground only, with the engines off and with the entire radiocommunication and/or radio navigation system off, with the exception of the on-board network. Nevertheless, the invention must be functional and accessible with or without support from the on-board network, so the equipment essential for proper operation of the method may be provided with its own individual power supplies (e.g. batteries); and the UHF frequencies of the readers also need adapting to comply with international regulations so as to enable the invention to be implemented in all countries.

That said, the invention is already capable of providing the following advantages:

complete and accurate configuration of an aircraft (hardware and software) that can be consulted at any time, at any place, and in real time with an appropriate tool that interrogates the database or target equipment;

each part can be tracked individually in terms of maintenance and operation, maintenance is no longer based on the aircraft but on each part; and the security of part traceability is improved and the risk of counterfeiting is limited, data tracking is optimized and made secure.

Nevertheless, the invention is not limited to the embodiments described. On the contrary, it extends to any equivalents of the characteristics described.

What is claimed is:

1. A method of tracking the configuration of an aircraft including a multitude of components for which it is desired to consult and record various items of data specific thereto including identification/authentication parameters, history, and an operating state, the method providing comprising:

installing a plurality of on-board wireless electronic labels on the components of the aircraft, each label being coupled and dedicated to a particular components, transferring data between the aircraft and an external installation fitting on board the aircraft at least two local readers: at least one wireless router compatible with and connected to one or more of the local readers, each reader being compatible with and near to a group of the labels, and a wireless concentrator compatible with the at least one router forming a wireless mesh network that defines a secrecy perimeter between a base node that wirelessly connects a group of the labels exclusively to a first one of the readers, an intermediate network frame that wirelessly connects the first reader exclusively to a first one of the at least one router, and an on-board terminal mesh that wirelessly connects the first router exclusively to the concentrator;

wherein during the transferring step the external installation communicates wirelessly exclusively with the concentrator, this communication passing within the aircraft via the wireless mesh network that defines the secrecy perimeter;

wherein during the installing step, the wireless mesh network is configured, in terms of range and of wireless communications protocol, to define around the aircraft said secrecy perimeter that coincides substantially with the outline of the aircraft outside which perimeter no wireless reading or writing of the electronic labels is possible; and wherein during the installing step, each wireless node is configured so that its electronic labels are coupled to components forming a functional group of the aircraft.

2. A method according to claim 1, wherein the electronic labels are suitable for communicating wirelessly with a nearby reader exclusively within their own respective nodes, while each of the at least one router is suitable for communicating wirelessly exclusively within the terminal mesh with the compatible concentrator.

3. A method according to claim 1, wherein the transferring step, is performed in a manner that is secure, automatic, and regular, during any use or maintenance of the aircraft, at regular intervals determined as a function of how an on-board timer is programmed, or at the end of a period of use or maintenance of the aircraft, a state detector of the aircraft is logically coupled to the terminal mesh so that said given state triggers the transferring step.

4. A method according to claim 1, wherein the transferring step is triggered manually or on demand, from the external installation or from a dedicated on-board control.

5. A method according to claim 1, wherein during the transferring step, specific data is transmitted from the electronic labels or is updated from the concentrator, with at least one step of coordination between a plurality of nodes and/or at least one step of filtering the specific data.

6. A method according to claim 1, wherein the wireless communication within the node, the network frame, and the terminal mesh, makes use of the ultra-high frequency (UHF) range, being of the wireless personal area network (WPAN) type.

7. A method according to claim 1, wherein the communications are secure radio links, complying with the IEEE 802.15.4 standard.

* * * * *